3,041,032
SUPPORT FOR A PICTURE PROJECTION SCREEN
Harvey N. Wilcox, Chicago, Ill., assignor to Commercial Picture Equipment, Inc., Chicago, Ill., a corporation of Illinois
Filed Jan. 7, 1959, Ser. No. 785,488
4 Claims. (Cl. 248—170)

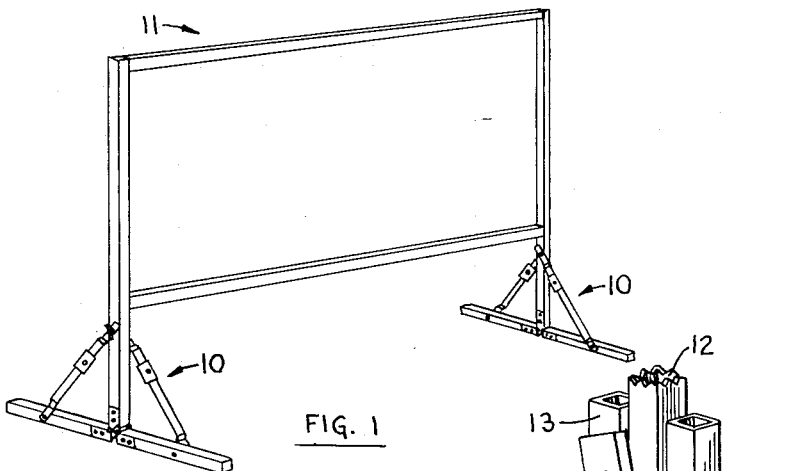
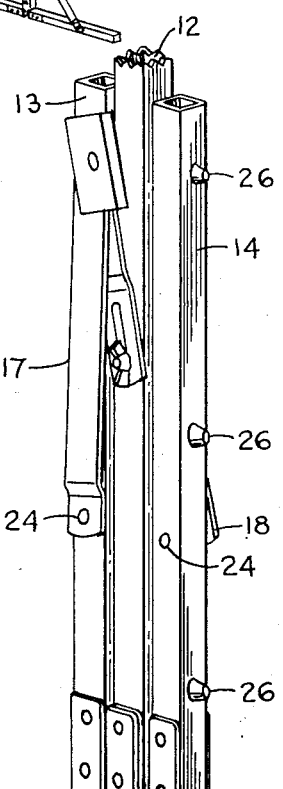
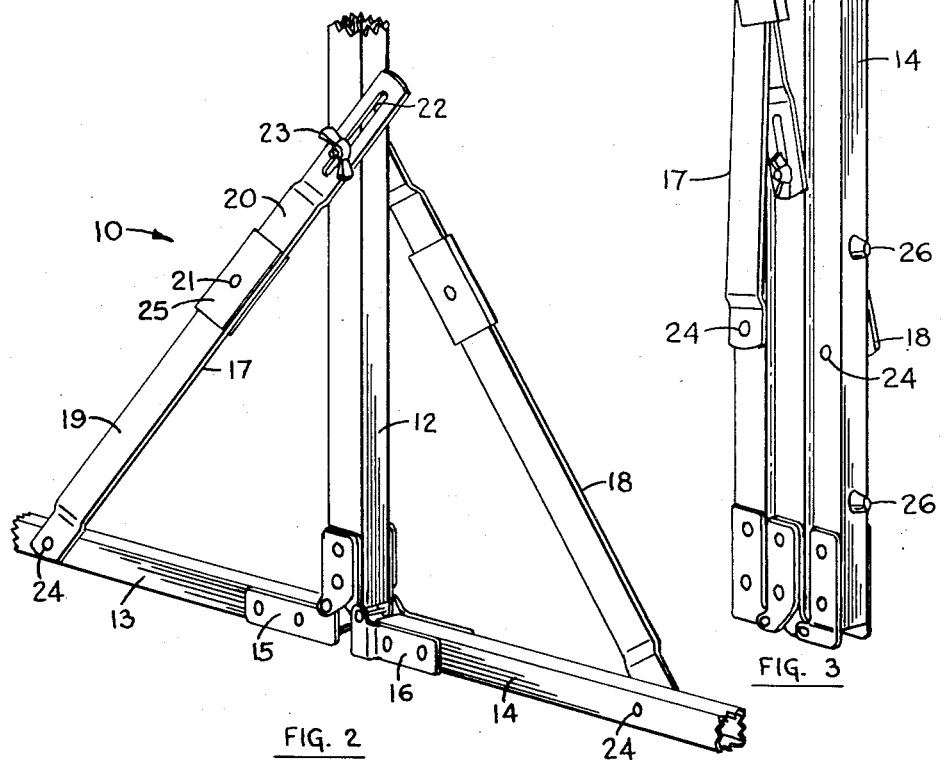
June 26, 1962 H. N. WILCOX 3,041,032
SUPPORT FOR A PICTURE PROJECTION SCREEN
Filed Jan. 7, 1959
INVENTOR.
HARVEY N. WILCOX United States Patent Office
3,041,032
Patented June 26, 1962

The present invention relates to supports for a picture projection screen and has to do particularly with that type of support having features for adjusting the angle at which the screen is supported relative to the supporting surface.

The object of the present invention is to provide means whereby the plane in which a portable picture screen is supported may be tilted to accommodate the screen to the placement of the picture projector. Portable screens have been commonly supported in a plane vertical to the floor of the room or associated stage upon which the screen supports stand. The projector may be located relatively below or above the screen, depending upon the arrangement of the room which is being utilized. Rarely are there accommodations in the rooms used for making presentations involving use of portable projection equipment and screens which permit a straight throw of the light beams carrying the picture onto the surface of the screen. As a result portions of the projected picture are out of focus or are distorted to the annoyance and discomfort of the viewing audience.

The present invention overcomes these objectionable conditions by providing a support having an upright, a base, and means for varying the angular relationship between the base and the upright. Two of the supports are necessary for the support of a single screen, one being positioned at either side of the screen frame with its upright aligned with and affixed to the side member of the screen frame. As the angular relationship of the uprights is varied with respect to their respective bases, the plane of the screen is tilted from the vertical. The uprights of the support may be tilted either forward or backward as is necessary to position the screen relative to the projector.

In the drawings:

FIG. 1 is a perspective view of a screen frame supported by a pair of supports illustrating the manner in which the frame and supports are associated;

FIG. 2 is a perspective view of a support showing the base and a portion of the upright set up in supporting position as in FIG. 1; and FIG. 3 is a perspective view of the same support as it may be collapsed.

Referring now to FIG. 1, a pair of identical supports 10, 10 are shown attached to the sides of a screen frame 11 and supporting the said frame in a fixed angular relationship to the bases of the supports 10. The uprights of the supports may be attached to the side members of the frame 11 by any suitable means, but preferably, the two are removably attached to permit ease in handling and to facilitate collapsing of the frame and supports into separate transportable packages of relatively small size.

One of the supports 10 is shown in detail in FIGS. 2 and 3. Referring first to FIG. 2, the support 10 consists of an upright 12, only partially shown, and a base made up of the identical feet 13, 14. One end of the foot 13 is hinged to the base of the upright 12 at its one side, the other foot 14 being hinged to the opposite side of the base of the upright 12. Here the hinges 15, 16 are illustrated joining the two feet 13, 14, respectively, to the base of the upright 12, but it is to be understood that the descriptive word "hinged" appearing in the specification and claims is used in its broadest sense and refers merely to a mechanical joint having a hinging or pivotal action. The hinged ends of the feet 13, 14 are spaced apart by the base of the upright 12 so as to be freely adjustable relative one to the other so that they may be made to conform to an irregular supporting surface if necessary. Ordinarily, the two feet 13, 14 comprising the base will lie in the same plane when the support 10 is erected.

A cross brace 17 has its lower end attached to the foot 13 at a point remote from the latter's hinged end. The attachment may be made by any suitable means, a rivet 24 having been here shown. The attachment is such, however, as to permit relative rotation of the brace 17 and the foot 13. The upper end of the cross brace 17 is releasably attached to the upright 12 at some distance above its base by a bolt extending through the upright 12 and an elongated aperture provided in this the upper end of the brace 17. A wing nut 23 may be manipulated to clamp or release the upper end of the brace 17.

In the preferred embodiment illustrated, the cross brace 17 is comprised of two members. The lower member 19 is attached at its lower end to the foot 13, and the upper member 20 is attached at its upper end to the upright 12. The members 19 and 20 have their adjacent ends pivotally joined by a rivet 20 which also retains the locking plate 25. The latter allows the lower and upper members 19 and 20 to be rotated through 180 degrees but prevents their relative rotation through a greater arc thereby making a rigid cross brace of the two when erected as shown in FIG. 2. By splitting the cross brace 17 into the two sections described, the brace may be collapsed drawing the foot 13 to a position alongside the upright 12 as shown in FIG. 3. To allow room for the locking plate 25 between the collapsed cross brace members 19 and 20 and the upright 12, a portion of each of the members 19 and 20, including the adjacent ends, is offset laterally outwardly from the base and upright 12.

The upper end of the cross brace 17, namely the upper member 20, has the elongated aperture 22 previously mentioned. The aperture 22 permits variation in the effective length of the cross brace 17 to change the angular relationship between the foot 13 and the upright 12. When the desired angle is established the wing nut 23 may be tightened thereby clamping the cross brace 17 to the upright 12 fixing the angular relationship.

An identical cross brace 18 is attached to the foot 14 and the upright 12. It is positioned on the side of the base and upright opposite to that of the cross brace 17. The cross brace 18 is in every respect identical to the cross brace 17. There is no need, therefore, to repeat the above description. The cross brace 18 is releasably attached to the upright 12 by the same bolt and wing nut 23 as attaches the brace 17.

The elongated aperture 22 may be made of any length desired within obvious practical limitations. The length of this aperture, and the length of the cross braces 17 and 18, determines the magnitude of the arc through which the upright 12 may be swung in varying its angular relationship to the base. The lower end of the aperture 22 formed in brace 17 and the upper end of the aperture 22 formed in brace 18 cooperate to limit the extent to which the upright 12 may be tilted back, as viewed in FIG. 2. Similarly, the lower end of the aperture 22 in brace 18 and the upper end of the aperture 22 in brace 17 cooperate to limit the extent to which the upright 12 may be tilted forward.

The feet 13 and 14 forming the base for each support are each of sufficient length to provide a firm base for the screen frame and screen through the complete range of angles to which the screen may be adjusted. The feet 13 and 14 may have their lower sides equipped with a plurality of pads or slides 26 to prevent marring of supporting surfaces, for ease in sliding the assembled screen and supports about, or for other similarly obvious reasons.

The supports herein described depend upon the screen frame to separate the supports thereby lending lateral support to the assembled structure as can be seen by reference to FIG. 1. No provision is made, therefore, for making the individual supports self-supporting it being contemplated that supports of this type will most commonly be used in association with screens of such size that a support must be provided at either side of the screen.

I claim:

1. A two legged screen assembly adapted for transient placement in stable upright position on floors for projection of pictures on the screen from a remote picture projection source and providing tiltable adjustability of the screen conjointly with the legs for facing the screen directly toward the picture projection source with the top and bottom portions of the screen equally distant from the source, the assembly comprising a projection screen and a pair of supporting standards, each standard being composed of a post with a collapsible floor engaging base at the lower end thereof by which the post is supported in a position extending directly upward from the floor, the screen being attached at opposite extremities respectively thereof to the posts in an upwardly extending position corresponding to that of the posts and the posts being interconnected by the screen in laterally spaced generally parallel relation with approximately equal portions of the length of the posts extending downwardly below the screen and providing legs by which the screen is supported at an elevation, each base comprising two elongated feet which project outwardly from the post forwardly and rearwardly respectively therefrom at the lower end thereof for supporting the post in an upright position to and from which it is tiltable forwardly and rearwardly, said feet being pivoted at their inner ends to the post to swing independently of one another for two operations thereof in one of which the feet while they project outwardly from the post are independently swingable to selectable respective forwardly and rearwardly projecting positions of angularity thereof relatively to the post for adjustably tilting the post and the screen therewith forwardly and rearwardly from said upright position and in the other one of which said two operations the two feet are independently swingable to upraised positions at the front and rear respectively of the leg portion of the post in general parallelism with one another and with the leg portion of the post to collapse the base in mutual compact relation along the leg portion of the post, each of the two elongated feet of each base having a separate foldable brace extending upwardly therefrom to the post, and releasable manually operable locking means by which said braces are securable to the post for holding the respective feet in said selectable positions of angularity thereof relatively to the post and in said upraised position thereof in general parallelism with one another and with the leg portion of the post, the brace of each foot being pivotally operable at the location of the locking means in swinging the foot to and from the said upraised position and lockable by the locking means against pivotal movement to hold the foot in the upraised position and the brace of each foot being slidable in the direction of the length of the brace in the swinging of the foot to said selectable positions for adjustably tilting the post and screen and lockable by said locking means against sliding movement in said selectable positions to hold the foot in such selectable positions.

2. A two legged screen assembly as defined in claim 1 in which each brace is of two pivotally interconnected parts which are generally aligned in the swinging of the foot to said selectable positions and the two parts thereof are folded to lie generally alongside one another in the said upraised position of the foot.

3. A two legged screen assembly as defined in claim 1 in which each brace is of two pivotally interconnected parts which are generally aligned in the swinging of the foot to said selectable positions and the two parts thereof are folded to lie generally alongside one another in the said upraised position of the foot, and the part at the upper end of the brace is pivotally operable at the location of the locking means and is slidable in the direction of the length thereof and lockable by the locking means against sliding movement.

4. A two legged screen assembly as defined in claim 1 in which each brace is of two pivotally interconnected parts which are generally aligned in the swinging of the foot to said selectable positions and the two parts thereof are folded to lie generally alongside one another in the said upraised position of the foot, and the part at the upper end of the brace is pivotally operable at the location of the locking means and is slidable in the direction of the length thereof and lockable by the locking means against sliding movement, and the braces of the two feet of each base fold to positions at opposite sides respectively of the collapsed base and intervening post.

References Cited in the file of this patent

UNITED STATES PATENTS

| 878,043 | Chrisman | Feb. 4, 1908 |
| 1,662,586 | Newman | Mar. 13, 1928 |
| 2,675,981 | Ferris | Apr. 20, 1954 |
| 2,849,202 | McCombs | Aug. 26, 1958 |